United States Patent
Watari et al.

(10) Patent No.: US 10,620,436 B2
(45) Date of Patent: Apr. 14, 2020

(54) HEAD-MOUNTED APPARATUS

(71) Applicant: SONY INTERACTIVE ENTERTAINMENT INC., Tokyo (JP)

(72) Inventors: Yasuhiro Watari, Tokyo (JP); Takayuki Ishida, Tokyo (JP); Akira Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/083,142

(22) PCT Filed: Feb. 9, 2017

(86) PCT No.: PCT/JP2017/004758
§ 371 (c)(1),
(2) Date: Sep. 7, 2018

(87) PCT Pub. No.: WO2017/163647
PCT Pub. Date: Sep. 28, 2017

(65) Prior Publication Data
US 2019/0033589 A1 Jan. 31, 2019

(30) Foreign Application Priority Data
Mar. 23, 2016 (JP) ................. 2016-058692

(51) Int. Cl.
*G09G 5/00* (2006.01)
*G02B 27/01* (2006.01)
(Continued)

(52) U.S. Cl.
CPC ........... *G02B 27/017* (2013.01); *G06F 1/163* (2013.01); *G06F 1/1686* (2013.01); *G06F 3/011* (2013.01);
(Continued)

(58) Field of Classification Search
CPC .......... G06F 3/011; G06F 3/017; G06F 3/013; G06F 3/012; G06F 3/04815;
(Continued)

(56) References Cited

U.S. PATENT DOCUMENTS

2005/0238202 A1  10/2005  Sato et al.
2013/0335303 A1  12/2013  Maciocci et al.
(Continued)

FOREIGN PATENT DOCUMENTS

JP  2005-242694 A  9/2005
JP  2014-067388 A  4/2014
(Continued)

OTHER PUBLICATIONS

International Search Report and Written Opinion dated Mar. 14, 2017, from International Application No. PCT/JP2017/004758, 8 sheets.
(Continued)

*Primary Examiner* — Duc Q Dinh
(74) *Attorney, Agent, or Firm* — Katten Muchin Rosenman LLP

(57) ABSTRACT

An image captured by a camera or the like mounted to a housing to be worn on the head of a user is receded, a first image portion corresponding to a first site of the body of the user is detected from the image, and a predetermined feature amount in the detected first image portion is acquired. In addition, an area which contains the first image portion within the image and in which the predetermined feature amount is continuously changed is specified, and a second image portion corresponding to a second site of the body of the user different from the first site is detected from an image portion within the specified area.

5 Claims, 6 Drawing Sheets

(51) Int. Cl.
*G06F 3/01* (2006.01)
*G06F 3/03* (2006.01)
*G06F 3/0346* (2013.01)
*G06F 1/16* (2006.01)
*H04N 5/225* (2006.01)

(52) U.S. Cl.
CPC .......... *G06F 3/0304* (2013.01); *G06F 3/0346* (2013.01); *H04N 5/2253* (2013.01)

(58) Field of Classification Search
CPC ............. G06F 3/04842; G06F 3/04817; G06F 3/04883; G06F 1/163; G06F 3/0488; G06F 3/0426; G02B 2027/0178; G02B 27/017; G02B 27/01; G02B 2027/011; G02B 2027/0185; G02B 27/0093; G02B 27/0179; G02B 2027/0138; G02B 2027/0127; H04N 5/23216; H04N 5/23293; H04N 13/271; H04N 13/282; H04N 13/344; H04N 5/2258; H04N 13/279; H04N 13/366; H04N 19/17; G06K 9/00201; G06K 9/00375; G06K 9/00912; G06K 9/46
USPC ........................................................ 345/7–9
See application file for complete search history.

(56) References Cited

U.S. PATENT DOCUMENTS

| | | | | |
|---|---|---|---|---|
| 2014/0068476 | A1* | 3/2014 | Kosaki | G06F 3/04817 715/765 |
| 2014/0247964 | A1* | 9/2014 | Kurokawa | G06F 3/005 382/103 |
| 2015/0062165 | A1* | 3/2015 | Saito | G02B 27/017 345/633 |

FOREIGN PATENT DOCUMENTS

| | | |
|---|---|---|
| JP | 2015-046092 A | 3/2015 |
| JP | 2015-519673 A | 7/2015 |
| WO | 2012/147961 A1 | 11/2012 |
| WO | 2013/188054 A1 | 12/2013 |

OTHER PUBLICATIONS

International Preliminary Report on Patentability dated Sep. 25, 2018, from International Application No. PCT/JP2017/004758, 11 sheets.

\* cited by examiner (a)

(b)

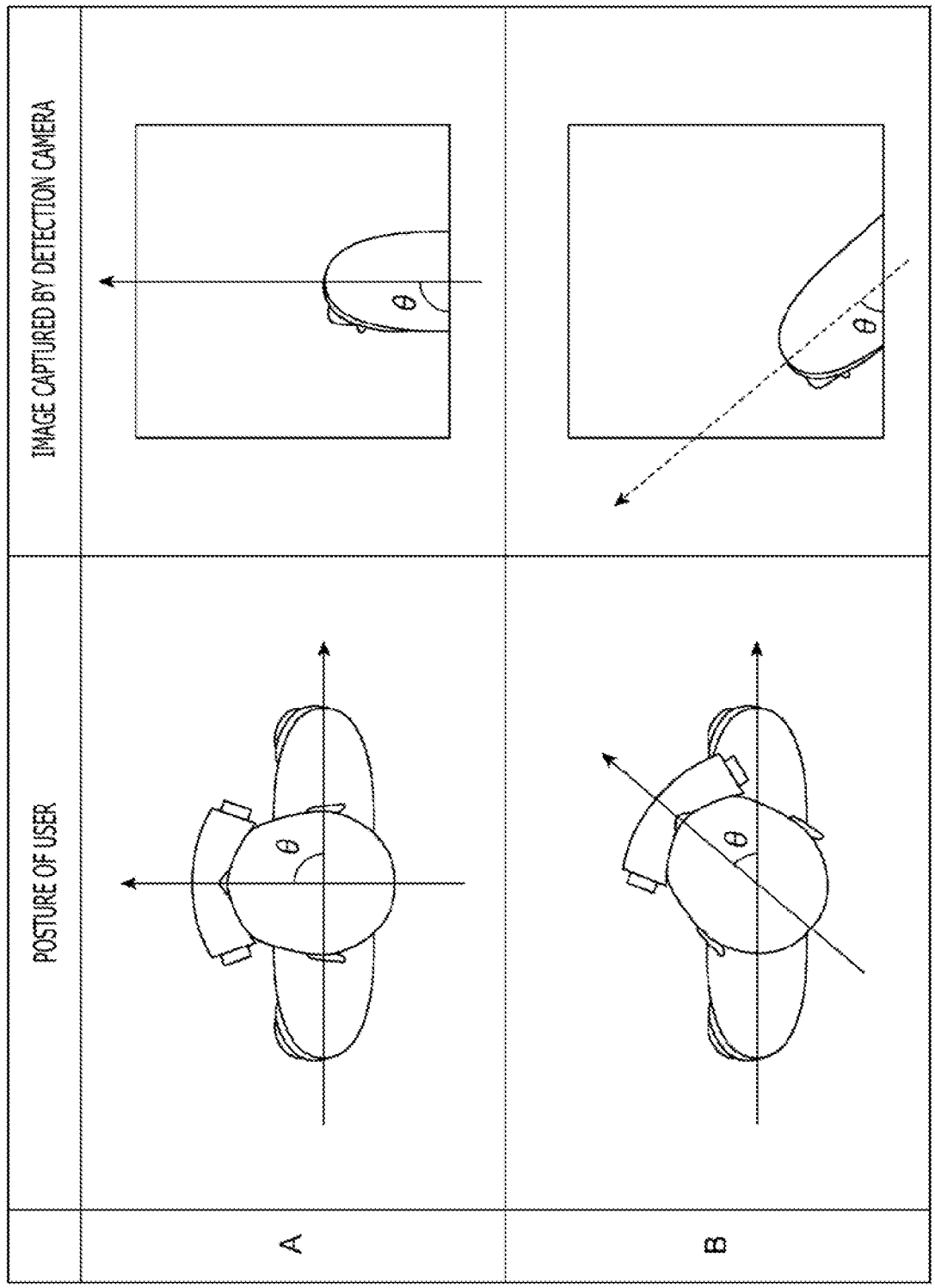

HEAD-MOUNTED APPARATUS

TECHNICAL FIELD

The present invention relates to a head-mounted apparatus which a user wears on his/her head to be used.

BACKGROUND ART

There is known an apparatus (head-mounted apparatus) called a head-mounted display, a smart glass or the like of a type which a user wears on his/her head to be used. Such a head-mounted apparatus forms an image in front of the eyes of the user, thereby presenting the image to the user.

SUMMARY

Technical Problem

In the case where the head-mounted apparatus such as the head-mounted display is used in video display of a game, or the like, there has been a desire to detect a motion of the hand or the like of the user who wears the head-mounted apparatus on his/her head. In the past, however, the motion of the user has been able to be detected only based on an input separately made from a controller or the like.

The present invention has been made in the light of the actual situation described above, and one of objects thereof is to provide a head-mounted apparatus which is capable of detecting a motion of a user without carrying out a manipulation for a controller.

Solution to Problem

A head-mounted apparatus according to the present invention includes imaging means, first detection means, area specifying means, and second detection means. In this case, the imaging means is mounted to a housing to be worn on the head of a user. The first detection means receives an image captured by the imaging means, detects a first image portion corresponding to a first site of the body of the user from the image, and acquires a predetermined feature amount in the first image portion thus detected. The area specifying means specifies an area which contains the first image portion within the image, and in which the predetermined feature amount is continuously changed. In addition, the second detection means detects a second image portion corresponding to a second site of the body of the user different from the first site from an image portion within the specified area.

BRIEF DESCRIPTION OF DRAWINGS

FIG. 6 is an explanatory view depicting an example of an operation for detecting a direction of a neck in the head-mounted apparatus according to the embodiment of the present invention.

DESCRIPTION OF EMBODIMENT

Hereinafter, an embodiment of the present invention will be described in detail based on the drawings. In this case, a description will now be given on the assumption that a head-mounted apparatus according to an embodiment of the present invention is a head-mounted display. The head-mounted apparatus of this embodiment does not need to be necessarily a head-mounted display, and may be any of apparatuses such as a headphone or a head band as long as it is adapted to be worn on the head of a user.

Figure 1:
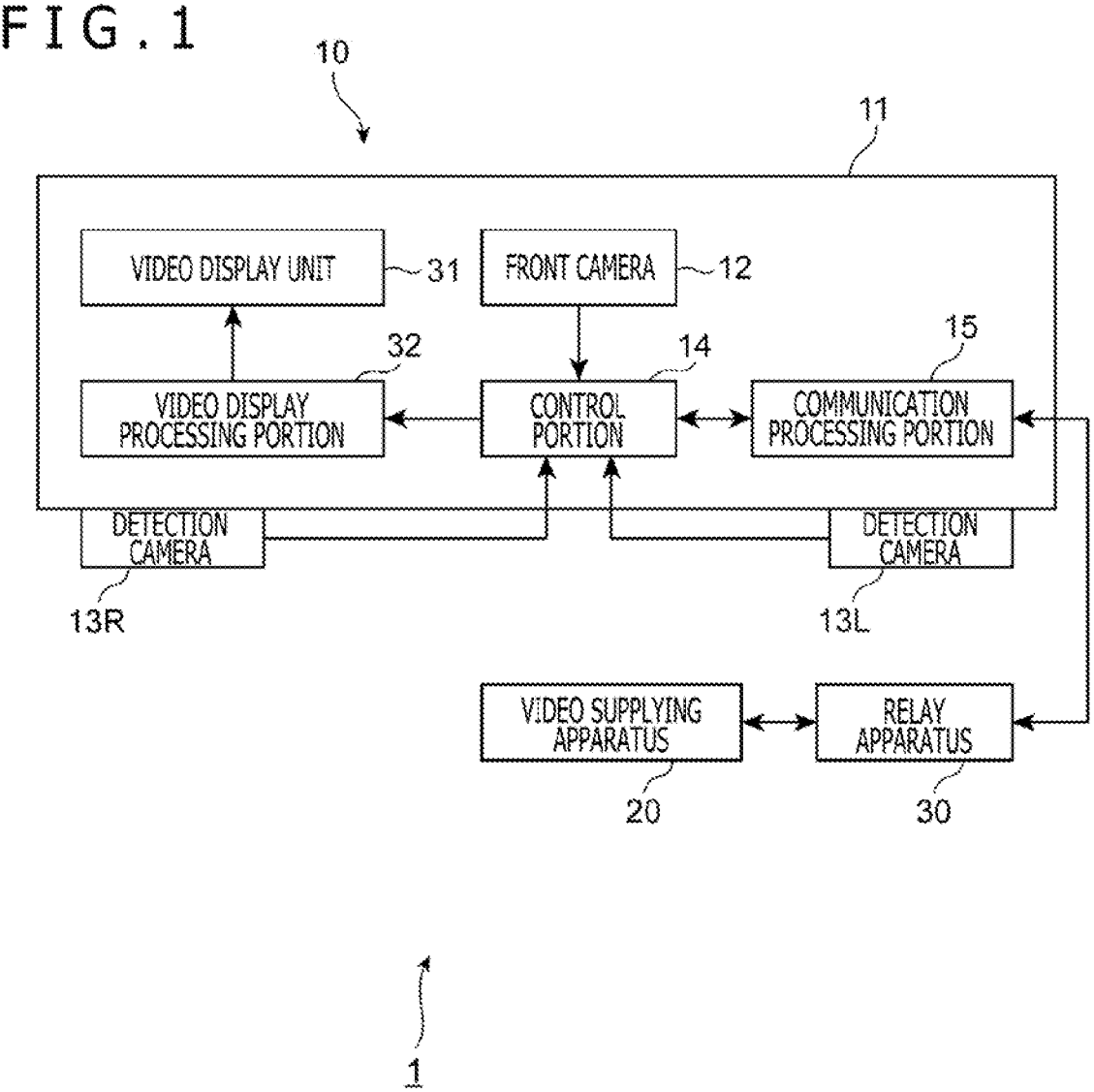
FIG. 1 is a block diagram depicting an outline of a video display system according to an embodiment of the present invention.

FIG. 1 is a block diagram depicting an entire outline of an information processing system 1 including a head-mounted apparatus 10 according to the embodiment of the present invention. The information processing system 1 in this embodiment includes the head-mounted apparatus 10, a video supplying apparatus 20, and a relay apparatus 30.

In an example of this embodiment, the head-mounted apparatus 10 is a video display apparatus which a user wears on his/her head to be used, and displays thereon a video responding to a video signal inputted thereto from the relay apparatus 30 which will be described later to present the video thus displayed to the user. In this embodiment, the head-mounted apparatus 10 responds to the browse of the video by both eyes. Thus, the videos independent of each other may be displayed in the respective fronts of the right eye and the left eye of the user.

The head-mounted apparatus 10 includes a housing 11, a front camera 12, detection cameras 13L and 13R, a control portion 14, and a communication processing portion 15. The housing 11 is worn on the head of the user. A video display unit 31 and a video display processing portion 32 are accommodated in the housing 11. In addition, the front camera 12 is mounted to a front surface (a surface lying in a direction corresponding to a line-of-sight direction of the user at the time of the wearing) of the housing 11. In addition, the detection cameras 13L and 13R are mounted to a left side surface and a right side surface of the housing 11, respectively.

The video display unit 31, for example, includes a display element for displaying a video for the left eye, and a display element for displaying a video for the right eye. Each of these display elements, for example, may be a liquid crystal display or an organic electroluminescence (EL) display panel. The user looks at the video for the left eye, and the video for the right eye by the left eye and the right eye, respectively, in a state in which he/she wears the head-mounted apparatus 10.

The video display unit 31 displays the videos on the display element for the left eye and the display element for the right eye independently of each other in accordance with a signal supplied thereto from the video display processing portion 32.

The video display processing portion 32 has a circuit which outputs a video signal to the video display unit 31 based on a video signal inputted thereto from the relay apparatus 30 through the communication processing portion 15.

The front camera 12 is arranged in the front surface (the surface lying in the direction corresponding to a line-of-sight direction of the user at the time of the wearing) of the housing 11 of the head-mounted apparatus 10. Thus, the front camera 12 captures an image in the front of the user, and outputs the image obtained by the capturing to the control portion 14.

The detection cameras 13L and 13R (hereinafter, in the case where they do not need to be especially distinguished from each other, they are written as the detection camera 13), for example, are mounted to the left side surface and the right side surface of the housing 11, respectively. Each of these detection cameras 13L and 13R includes a plurality of (for example, a pair of) imaging elements. The plurality of imaging elements are arranged at a distance from each other. The detection camera 13 captures images in field-of-view ranges on a side and a lower side of the user by the respective imaging elements, and outputs the pieces of image data obtained by the capturing to the control portion 14. In a certain example of this embodiment, the detection camera 13 realizes imaging means of the present invention.

The control portion 14 includes a program control device such as a central processing unit (CPU), and a storage device for holding therein a program. The program is presented in a state of being stored in a computer readable and non-transitory medium (such as a digital versatile disc-read only memory (DVD-ROM)), and may be stored in this storage device.

The control portion 14 is operated as follows by executing the program concerned. The control portion 14 receives an image captured by the detection camera 13, and detects a first image portion corresponding to a first site of the body of the user from the image concerned. In addition, the control portion 14 acquires a predetermined feature amount (which will be described later) in the first image portion thus detected.

In addition, the control portion 14 specifies an area which includes the first image portion within the data associated with the image captured by the detection camera 13 and in which the predetermined feature amount is continuously changed. Here, the continuous change means that a difference between the feature amount in a position where attention is paid within the image data, and the feature amount in a position adjacent to the position described above falls below a predetermined threshold value. In a word, when the difference between the feature amount in the position where attention is paid within the image data, and the feature amount in the position adjacent to the position described above falls below the predetermined threshold value, the control portion 14 shall decide that the feature amount continues between the position where attention is paid and the position adjacent thereto.

The control portion 14 further executes processing for detecting a second image portion corresponding to a second site of the body of the user different from the first site from the image portion within the specified area described above. The control portion 14 produces data used to specify the position of the detected second image portion, and outputs the resulting data. The detailed operation of the control portion 14 will be described later.

The communication processing portion 15 is an interface through which the various pieces of data are communicated with the relay apparatus 30. Specifically, the head-mounted apparatus 10 carries out the transmission/reception of the data between itself and the relay apparatus 30 through wireless communication such as a wireless local network (LAN) or Bluetooth (registered trademark). In this case, the communication processing portion 15 includes an antenna for communication and a communication module. The communication processing portion 15 sends the data associated with the image captured by the front camera 12, and the data or the like outputted from the control portion 14 for the relay apparatus 30 in accordance with an instruction inputted thereto from the control portion 14. In addition, the communication processing portion 15 executes processing for receiving the data or the like associated with the video signal from the relay apparatus 30, outputting the data concerned to the control portion 14, and so forth. In this example, the control portion 14 outputs the video signal received from the relay apparatus 30 to the video display processing portion 32, thereby presenting the video to the user.

The video supplying apparatus 20 is an information processing apparatus for supplying the video which the head-mounted apparatus 10 presents to the user. The video supplying apparatus 20, for example, may be a video game console, a portable game console, a personal computer, a smartphone, a tablet or the like. In an example of this embodiment, the video supplying apparatus 20 receives the data used to specify the position of the second site of the body of the user from the head-mounted apparatus 10 through the relay apparatus 30, and executes the processing based on the data concerned. As an example, in the case where the position of the second site is a position of a hand of the user, the video supplying apparatus 20 decides which of the portions of the video outputted to the head-mounted apparatus 10 the hand of the user is located in a position corresponding to, and produces a video depicting as if the user touches an object in the video and outputs the video to the head-mounted apparatus 10, and so forth. Thus, the video supplying apparatus 20 executes the processing or the like for producing the virtual reality.

The relay apparatus 30 receives the data associated with the video supplied thereto from the video supplying apparatus 20, and outputs the video signal responding to the received data to the head-mounted apparatus 10. The relay apparatus 30 is connected to the head-mounted apparatus 10 either in a wired fashion or in a wireless fashion. In an example of this embodiment, the relay apparatus 30 includes a video processor which converts the video data supplied from the video supplying apparatus 20 into a video signal which can be displayed in the head-mounted apparatus 10, and outputs the video signal obtained through the conversion to the head-mounted apparatus 10. The relay apparatus 30 according to an example of this embodiment outputs the data received from the head-mounted apparatus 10 to the video supplying apparatus 20.

Figure 2:
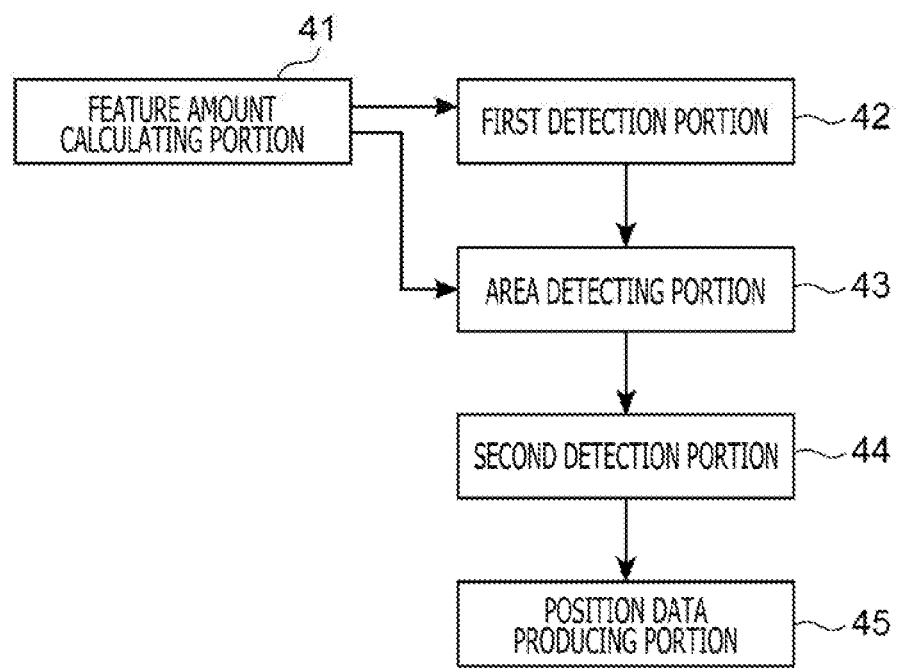
FIG. 2 is a block diagram depicting an example of a functional configuration of a head-mounted apparatus according to an embodiment of the present invention.

Next, a description will be given with respect to an operation by the control portion 14 of the head-mounted apparatus 10 of this embodiment. In an example of this embodiment, in terms of function, as exemplified in FIG. 2, the control portion 14 includes a feature amount calculating portion 41, a first detection portion 42, an area detecting portion 43, a second detection portion 44, and a position data producing portion 45.

The feature amount calculating portion 41 calculates a predetermined feature amount for every portion (for example, every pixel constituting the image data, or every block including a plurality of pixels) of the image data concerned in response to the input of the image data. In an example of this embodiment, this feature amount is a feature amount which is changed in response to a distance between a subject imaged in a portion of the image data and the detection camera 13 as the imaging means, for every portion of the image data.

For example, the feature amount calculating portion 41 produces a so-called depth map and outputs the resulting depth map. Here, the depth map is map image data having the same size as that of each of the pieces of image data outputted from the detection camera 13. In addition, the depth map is such that values of the pixels in the positions corresponding to the portions within the original image data outputted from the detection camera 13 are determined based on a distance up to the subject imaged in the portion concerned within the original image data. Since a concrete method for the processing for producing the depth map from the two or more pieces of image data in such a way has already been known, a detailed description thereof is omitted herein.

The first detection portion 42 receives the pieces of image data captured in the detection camera 13L and the detection camera 13R and detects a first image portion corresponding to the first site of the body of the user from the pieces of image data. Specifically, the first site is assumed to be a body site of the user closest to the detection camera 13, for example, a shoulder.

In this example, the first detection portion 42 outputs each of the pieces of image data obtained from the detection cameras 13L and 13R to the feature amount calculating portion 41. Then, with respect to the respective pieces of data associated with the images captured by the detection cameras 13L and 13R, the data associated with the corresponding depth maps is obtained.

Then, the first detection portion 42 detects a portion having a predetermined shape (in the case of the shoulder, a tongue-shaped portion in which a circumscribed shape is substantially a U-letter shape) located in a position closest to the detection camera 13L or 13R within the data associated with corresponding one of the images captured by the detection cameras 13L and 13R as the first site of the body of the user by using the data associated with the depth map.

In addition, the first detection portion 42 outputs a set of information (coordinate information of the pixels) used to specify the pixels contained in a first image petition with the image portion corresponding to the detected first site as the first image portion, from among the pieces of image data obtained from the respective detection cameras 13L and 13R.

The area detecting portion 43 specifies an area which contains the pixels specified with the information contained in the set outputted from the first detection portion 42, and in which the predetermined feature amount is continuously changed with reference to the data associated with the depth map outputted from the feature amount calculating portion 41.

Figure 3:
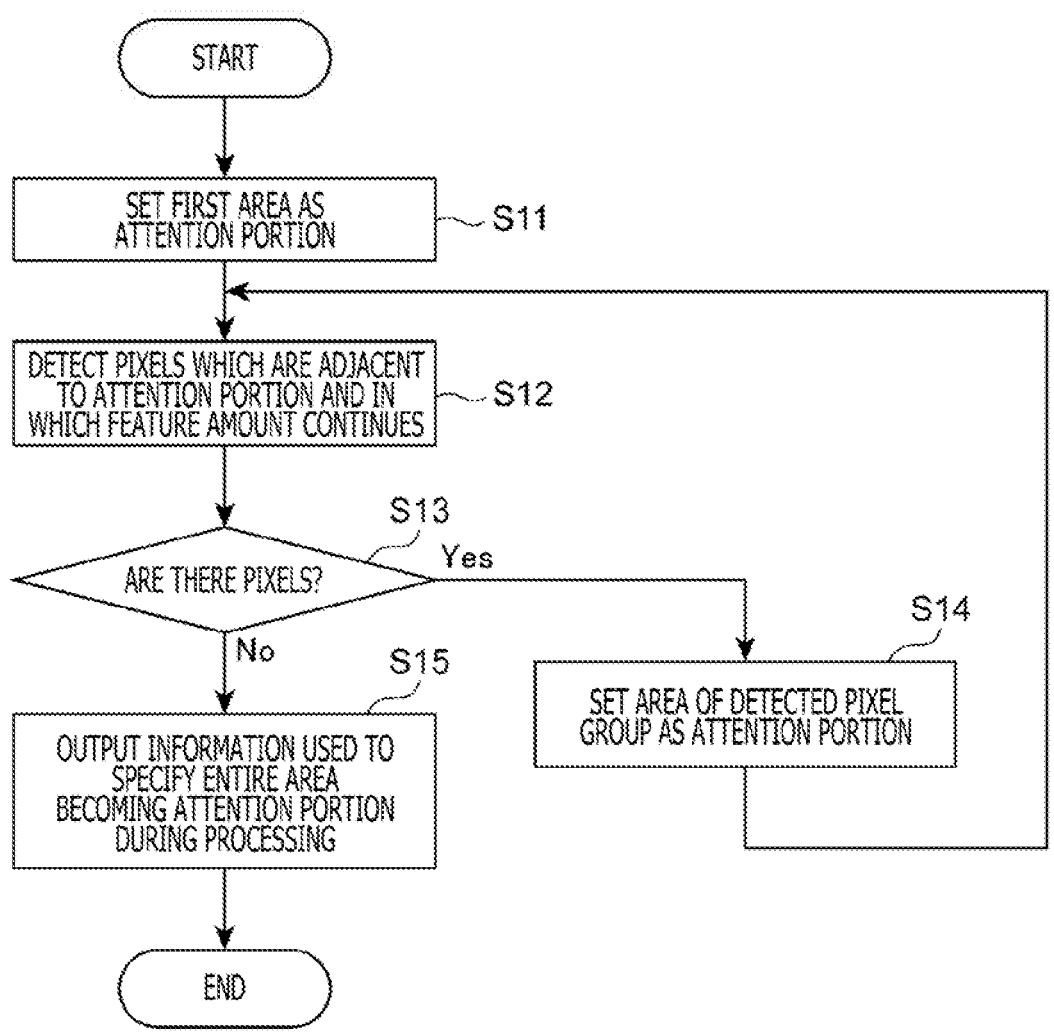
FIG. 3 is a flow chart depicting an example of an operation of an area detecting portion of the head-mounted apparatus according to the embodiment of the present invention.

Specifically, the area detecting portion 43 executes processing exemplified in FIG. 3. Specifically, the area detecting portion 43 specifies a portion corresponding to the pixels specified with the information contained in the set outputted from the first detection portion 42 as an attention portion on the depth map outputted from the feature amount calculating portion 41 (S11). The area detecting portion 43 refers to a feature amount (in this case, information associated with a distance from the detection camera 13) of the pixels contained in the attention portion, and retrieves the pixels which are not the pixels contained in the portion specified as the attention portion in the past and in which a difference between the feature amount pertaining to the pixels concerned and the feature amount of any of the pixels contained in the attention portion falls below a threshold value determined in advance, from among the pixels adjacent to the attention portion concerned by (S12).

The area detecting portion 43 checks to see if there are the pixels found out by the retrieval in the processing S12 (S13). If there are the pixels found out (S13: Yes), the area detecting portion 43 sets a portion having the found pixel (all the pixels found out in the case where there are a plurality of pixels) as the attention portion (S14), and returns back to the processing S11 to continue the processing. In a word, the area detecting portion 43 repetitively executes the processing in which the pixel which is adjacent to the attention portion and in which the feature amount thereof can be evaluated as being continuously changed is selected as a new attention portion. As a result, the area detecting portion 43 successively specifies the area which contains the pixel portion (the portion corresponding to a first area) selected as the attention portion at first and in which the feature amount is continuously changed while that area is expanded.

In addition, in the processing in S13, if it is decided as a result of the retrieval that there is no pixel found out (S13: No), the area detecting portion 43 specifies the area of the image portion, selected as the attention portion, as the area in which the feature amount is continuously changed while the processing until the decision concerned is made is executed. Then, the area detecting portion 43 outputs the information representing the specified area concerned (S15). Here, the information representing the area may be a set of information (coordinate information associated with the pixels) with which the pixel contained in the area is specified.

The second detection portion 44 detects a second image portion corresponding to a second site of the body of the user different from the first site from the image portion within the area specified with the information outputted from the area detecting portion 43.

For example, the second detection portion 44 detects an end in a length direction of the area specified with the information outputted from the area detecting portion 43 as the second image portion corresponding to the second site. Specifically, the second detection portion 44 detects a rectangle circumscribing the area specified with the information outputted from, the area detecting portion 43, and compares a length in an axis of abscissa of the detected rectangle and a length in an axis of ordinate of the detected rectangle with each other. The second detection portion 44, as a result of the comparison, sets the axial direction of the longer side of the axis of abscissa and the axis of ordinate as a longer direction. The second detection portion 44 selects the pixel within the area described above contacting a side on a side located away from the center of gravity of the first site detected by the first detection portion 42 of both ends (the sides orthogonally intersecting the longer direction) in the longer direction as the attention pixel. Here, the center of gravity of the first site means the center of gravity of the pixel group within the image portion corresponding to the first site. Specifically, when the coordinates of the pixel group are $(x_i, y_i)$ ($i=1, 2, \ldots, N$), it is only necessary that the center of gravity of the pixel group is obtained in the form of an average $\Sigma (x_i, y_i)/N$ thereof.

Alternatively, the second detection portion 44 selects the pixel located in the position farthest from the center of gravity of the image portion corresponding to the first area, from among the image portions within the area specified with the information outputted from the area detecting portion 43, as the attention pixel.

Then, the second detection portion 44 sets a virtual circle, a radius of which is determined with the attention pixel as a center by using a predetermined method. Here, the radius, for example, may be a radius determined in advance, or may be a radius (for example, in a portion farther from the detection camera 13, the radius is reduced) determined in response to the distance, from the detection camera 13, of the selected attention pixel from the information associated with the depth map.

The second detection portion 44 detects the pixel contained in the virtual circle and located within the area specified with the information outputted from the area detecting portion 43 as a second image portion corresponding to the second site.

The position data producing portion 45 produces data with which the second image portion detected by the second detection portion 44 is specified, and outputs the resulting data. Specifically, the position data producing portion 45 outputs a set of information (coordinate information of pixels) with which the pixel group contained in the second image portion detected by the second detection portion 44 is specified.

Example of Operation

The head-mounted apparatus 10 pertaining to an example of this embodiment is provided with the configuration described above, and operates as follows.

The head-mounted apparatus 10 captures images in a downward direction from a side of the user wearing the head-mounted apparatus 10 at a predetermined timing (for example, at a timing at which an instruction is received from the video supplying apparatus 20 side) by a plurality of imaging elements of the detection camera 13 (so-called stereoscopic photography).

Figure 4:
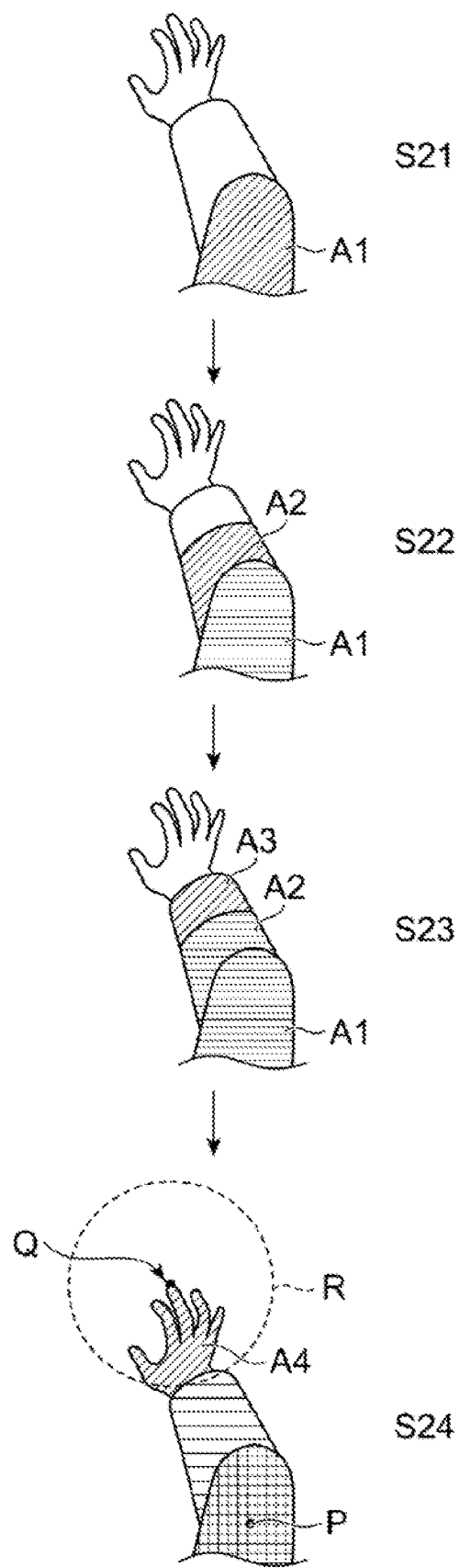
FIG. 4 is an explanatory view depicting an outline of an operation of the head-mounted apparatus according to the embodiment of the present invention.

Then, the head-mounted apparatus 10, for every pixel of the resulting image data, calculates information representing a distance between a subject imaged by the pixel concerned and the detection camera 13 as the feature amount, and produces the depth map. In this example, specifically, it is assumed that an image exemplified in FIG. 4 is captured. Since the shoulder of the user is normally located on the downward side on the side of the head of the user, the detection camera 13 shall normally capture the image containing the shoulder in the closest position.

Then, the head-mounted apparatus 10 detects a portion in which the shoulder as the first site of the body of the user is imaged by using the data associated with the image captured by the detection camera 13 and the depth map. For example, the head-mounted apparatus 10 detects the tongue-shaped portion which is located in the position closest to the detection camera 13 within the data associated with the image captured by the detection camera 13, and which substantially is a U-letter shape as the shoulder of the body of the user.

Next, the head-mounted apparatus 10 specifies the image portion of the shoulder of the user detected on the depth map as an initial attention portion A1 (S21). The head-mounted apparatus 10 retrieves the pixel, of the pixels adjacent to the initial attention portion A1, in which the difference between the feature amount pertaining to the pixel concerned and the feature amount of any of the pixels contained in the initial attention portion A1 falls below the threshold value determined in advance by referring to the feature amount (in this case, the information associated with the distance from the detection camera 13) of the pixel contained in the initial attention portion A1.

In this case, as a result of the retrieval concerned, a portion of the image corresponding to a part of an upper arm adjacent to the initial attention portion A1 is detected as the portion in which the distance continues from the shoulder. Next, with the newly detected portion as the new attention portion, the head-mounted apparatus 10 retrieves, from among the pixels adjacent to the attention portion, the pixel which is not the pixel contained in the portion specified as the attention portion in the past (in a word, in this case, the pixel contained in the image portion A1) and in which the difference between the feature amount pertaining to the pixel concerned and the feature amount of any of the pixels contained in the attention portion falls below the threshold value determined in advance.

Hereinafter, this processing is repetitively executed, which results in that a portion A2 corresponding to the upper arm of the user becomes the portion selected as the attention portion in the past, and thus the portion A2 of the upper arm is detected (S22).

In the head-mounted apparatus 10, hereinafter, similarly, the processing is executed while the portion in which the feature amount continues is selected as the attention portion. As a result, the head-mounted apparatus 10 detects a portion A3 of the image corresponding to a lower arm of the user (S23) as the portion in which the distance continues from the upper arm, and also detects a portion A4 of the image corresponding to a hand of the user as the portion in which the distance continues from the lower arm of the user (S24).

Next, the head-mounted apparatus 10 sets the newly detected portion A4 as the new attention portion. The head-mounted apparatus 10 retrieves, from among the pixels adjacent to the attention portion A4, the pixels which are not the pixels contained in the portion specified as the attention portion in the past (in this case, the pixels contained in the image portions A1, A2 and A3) and in which the difference between the feature amount pertaining to the pixels concerned and the feature amount of any of the pixels contained in the attention portion A4 fails below the threshold value determined in advance. However, in a state in which the user holds nothing in the hand, a flower surface or the like generally lies ahead from the hand, and thus a portion (there is a difference in distance exceeding the threshold value) lies in which a distance from the hand is not continuous. For this reason, the head-mounted apparatus 10 decides as a result of the retrieval that there is no pixel found out, and specifies the area of the image portion selected as the attention portion as the area in which the feature amount is continuously changed while the processing until the decision concerned is made is executed.

In a word, the head-mounted apparatus 10 collectively specifies the image portions A1, A2, A3, and A4 each selected as the attention portion by this time as the area in which the feature amount is continuously changed. Then, the head-mounted apparatus 10 outputs the information representing the specified area. Here, information representing the specified area is a set of information (the coordinate information associated with the pixels) with which the pixels contained in the image portions A1, A2, A3, and A4 are specified.

In addition, the head-mounted apparatus 10 obtains the center P of gravity of the image portion A1 of the shoulder detected at first, and selects a pixel Q located in a position farthest from the center P of gravity as the attention pixel. Moreover, the head-mounted apparatus 10 sets a virtual circle R having a radius determined in advance with the attention pixel Q as the center. The head-mounted apparatus 10 detects the pixel contained in the virtual circle R set herein and lying within any of the image portions A1, A2, A3, and A4 as the second image portion corresponding to the second site. In the case of this example, it is supposed that the pixel Q located in the position farthest from the center of gravity of the shoulder normally is the pixel with which a fingertip (or the wrist in the case where the fingertip is directed toward the shoulder side) is imaged. In a word, it is thought, that the hand is imaged with the pixels located within the predetermined radius from the pixel concerned. Then, the head-mounted apparatus 10 determines the second image portion detected herein as the image portion of the hand, and produces and outputs the data used to specify the second image portion. In this case, the head-mounted apparatus 10 outputs a set of information (the coordinate information associated with the pixels) with which the pixel group contained in the second image portion is specified.

The head-mounted apparatus 10 of this embodiment executes the processing described above based on the pieces of data associated with the images captured by the detection cameras 13L and 13R which are respectively provided on the left side and the right side of the housing 11. Then, the head-mounted apparatus 10 outputs the set of information used to specify the pixel group of the image portion of the hand which is detected from the data associated with the respective images captured in the left and right directions of the housing 11. In addition, the head-mounted apparatus 10 may output the data associated with the images captured by the detection cameras 13L and 13R. It should be noted that although in the example of this embodiment, a plurality of imaging elements are included in the detection camera 13 in order to carry out the stereoscopic photography, any one of a plurality of imaging elements may be selected, thereby outputting the image data. Moreover, the head-mounted apparatus 10 may output the respective images of the depth maps which are produced based on the data associated with the images captured by the detection cameras 13L and 13R.

In the information processing system 1 including the head-mounted apparatus 10 according to the embodiment of the present invention, the data outputted from the head-mounted apparatus 10 is inputted to the video supplying apparatus 20 through the relay apparatus 30 in such a manner.

The video supplying apparatus 20 receives the input such as the set of information, used to specify the pixel group of the image portion of the hand, which is detected from the data associated with the images captured in the left and right directions of the housing 11 of the head-mounted apparatus 10. In this case, the set of information is outputted from the head-mounted apparatus 10. In addition, the video supplying apparatus 20 separately obtains the data associated with the position and direction of the head-mounted apparatus 10, and obtains the three-dimensional position information associated with the position of the hand of the user from these pieces of data. The three-dimensional position information, for example, can be expressed as values in the coordinate system (world coordinate system) using the head of the user as the center of the coordinates, with a crosswise direction (a direction of a line segment generated through the crossing between a coronal plane and a transverse plane) of the body of the user as the X-axis, with a vertical direction (a direction of a line segment generated through the crossing between the coronal plane and a sagittal plane) as the Y-axis, and with a depth direction (a direction of a line segment generated through the crossing between the sagittal plane and the transverse plane) as the Z-axis.

The coordinates of the detection cameras 13L and 13R with which the head-mounted apparatus 10 is provided, and the information associated with the line-of-sight direction thereof are obtained based on the data associated with the position and direction of the head-mounted apparatus 10, and the coordinate conversion is carried out by using the resulting information, thereby enabling the processing in the video supplying apparatus 20 to be executed. Specifically, for the coordinate conversion, it is possible to adopt the widely known processing such as the conversion from the camera coordinate system (the coordinate system determined by the axis of the line-of-sight direction of the camera and the axis of the orthogonal coordinate within the plane with the line-of-sight direction as the normal line direction) into the world coordinate system.

For the processing of measuring the position and direction of the head-mounted apparatus 10, in a certain example of this embodiment, the head-mounted apparatus 10 may have a motion sensor in order to measure the various kinds of information associated with the position, the direction, and the motion of the head-mounted apparatus 10. A motion sensor including a triaxial acceleration sensor, a triaxial gyroscope, a triaxial terrestrial magnetism sensor, an atmospheric pressure sensor or the like can be used as the motion sensor for carrying out such measurements.

By using the measurement results, the change in motion and direction of the head-mounted apparatus 10 is specified. Specifically, by using the detection results of the acceleration sensor, a tilt and a parallel movement of the head-mounted apparatus 10 with respect to the vertical direction can be detected. In addition, by using the gyroscope or the terrestrial magnetism sensor, a rotational motion of the head-mounted apparatus 10 can be detected. Moreover, by using the atmospheric pressure sensor, the motion of the head-mounted apparatus 10 along the vertical direction can be detected.

It should be noted that although in addition to the method described herein, the various kinds of known methods can be used as the method of obtaining the position and direction of the head-mounted apparatus 10 by the video supplying apparatus 20, any further detailed description is omitted herein.

Modified Changes

Although the description until now has been given in such a way that the feature amount calculated by the feature amount calculating portion 41 of the control portion 11 represents the distance up to the object imaged by the detection camera 13, this embodiment is by no means limited thereto. For example, the feature amount may be the information representing the normal line direction to the subject imaged in the image portion. In this case, a configuration may be adopted in which the housing 11 of the head-mounted apparatus 10 is provided with a device (not depicted) which projects structured light, such as a device which uses a Moire method, and in capturing the image data with the detection camera 13, the imaging is carried out by projecting the structured light on the body of the user. If the means for projecting the structured light is provided, then, the information in the normal line direction can be acquired by using a three-dimensional measurement method by a structured light projection method. In addition, the information in the normal line direction may also be acquired by using the widely known three-dimensional measurement method other than the structured light projection method.

In the case as well where the information associated with the normal line is used in such a way, similarly to the case of the method using the distance from the detection camera 13, if the shoulder can be detected, then, the normal line direction is continuously changed from the shoulder to the hand through the upper arm and the lower arm (the difference between the pieces of information in a direction of a pair of normal lines measured with the pixels adjacent to each other, or the angle in direction between a pair of normal lines fails below the predetermined threshold value). Therefore, by detecting the area in which the normal line direction continues, it is possible to detect the range in which the hand is imaged in the data associated with the image captured by the detection camera 13.

Arrangement of Camera

Although the example of this embodiment until now has been given in such a way that the detection camera 13 is arranged on the left and right sides of the housing 11, this arrangement is not necessarily made on the left and right sides of the housing 11 as long as the portion corresponding to the first site such as the shoulder of the user can be imaged. For example, the detection camera 13L may also be arranged on the left end side of the lower portion of the housing 11. In addition, the detection camera 13R may also be arranged on the right end side of the lower portion of the housing 11.

Another Utilization Example

The head-mounted apparatus 10 of this embodiment may also detect the arm portion of the user based on the data associated with the image captured with the detection camera 13. Specifically, when the head-mounted apparatus 10 selects the pixel which is adjacent to the attention portion in the operation of the area detecting portion 43 and in which the difference in feature amount between itself and any one of the pixels contained in the attention portion falls below the predetermined value (there may be a plurality of pixels), the head-mounted apparatus 10 calculates the information representing a direction of a line segment connecting the center of gravity of the pixel group being the attention portion at that time, and the center of gravity of the pixel group newly selected to each other.

At first, in the stage in which the area corresponding to the first site is the attention portion, the head-mounted apparatus 10 records the information representing the direction of the calculated line segment and issues label information. In this case, the head-mounted apparatus 10 sets the label information as a predetermined initial value, for example, a numerical value of "1." Then, the head-mounted apparatus 10 stores the information used to specify the pixel group newly selected so as to be associated with the label information concerned.

Hereinafter, whenever the head-mown ted apparatus 10 calculates the information representing the direction of the line segment described above, the head-mounted apparatus 10 compares the information recorded last time, and the calculated information concerned with each other to obtain a difference between the pieces of information. In the case where the difference (since the pieces of information are vectors, the difference between the crossing angles in the directions of the line segments may be obtained by dividing an inner product by a product of the magnitudes of the vectors) falls below a predetermined angle threshold value, the information calculated this time is recorded and is added to the information associated with the label information issued last time, thereby successively storing the information used to specify the pixel group newly selected this time.

In addition, in the case where the difference described above exceeds the predetermined angle threshold value, the head-mounted apparatus 10 records the information calculated this time and representing the direction of the line segment, and issues the new label information (for example, the numerical value as the label information at that time is incremented by "1" to be made the new label information). In addition, the head-mounted apparatus 10 stores the information used to specify the pixel group newly selected this time so as to be associated with the issued label information concerned.

This processing is repetitively executed until the pixel is selected no longer, thereby resulting in that the head-mounted apparatus 10 can specify the area in which the feature amount is continuously changed, and can carry out the labeling for every site which is linearly changed within the area concerned. In this example, in the case where the user bends the elbow or the wrist, the pixels corresponding to the respective sites of the upper arm, the lower arm, and the hand shall be marked with the labels different from one another.

As a result, the head-mounted apparatus 10 can detect the arm portions of the user such as the upper arm and the lower arm.

Moreover, the head-mounted apparatus 10 may decide whether the arm portions detected in this case cross each other (a part of one arm is hidden by the other arm) or does not cross each other when viewed from the point of view of the user. In this case, the detection cameras 13L and 13R are arranged in the front of the housing 11, and are mounted to the positions where the downward images can be captured.

In the case where the user crosses his/her hands each other, the labeling is carried out as exemplified in FIG. 5(a). Incidentally, in FIGS. 5(a) and (b), for the description, the result of the labeling obtained based on the data associated with the image captured by the right-side detection camera 13R is depicted so as to add a suffix R like "1R," "2R," and the like. On the other hand, the result of the labeling obtained based on the data associated with the image captured by the left-side detection camera 13L is depicted so as to add a suffix L like "1L," "2L," and the like.

As depicted in FIG. 5(a), in the case where the user crosses his/her hands each other, the head-mounted apparatus 10 detects portions marked with the labels 2L, 2R, and 3R as the portions in which the feature amounts continue from the respective labels 1L and 1R with which the image portions corresponding to the shoulders are marked.

In this case, the head-mounted apparatus 10 checks to see if the areas of the labels to which the suffixes different from one another are added are adjacent to each other. In a word, the head-mounted apparatus 10 checks to see if the areas (the areas marked with the labels 1L and 2L) which are obtained based on the data associated with the image captured by the left-side detection camera 13L and in which the feature amount is continuously changed, and the areas (the areas marked with the labels 1R, 2R and 3R) which are obtained based on the data associated with the image captured by the right-side detection camera 13R and in which the feature amount is continuously changed are adjacent to each other.

In this case, if these areas are adjacent to each other, then, the head-mounted apparatus 10 decides that the arms of the user cross each other (FIG. 5(a)). In addition, at this time, the head-mounted apparatus 10 may decide which of the left and right hands is placed on top of the other hand by comparing the sizes of the areas in which the feature amount is continuously changed with each other. That is to say, if the relatively large area is obtained based on the data associated with the image captured by the right-side detection camera 13R, then, the head-mounted apparatus 10 decides that, the right arm is placed on top of the left arm. On the other hand, if the relatively large area is obtained based on the data associated with the image captured by the left-side detection camera 13L, then, the head-mounted apparatus 10 decides that the left arm is placed on top of the right arm.

Figure 5:
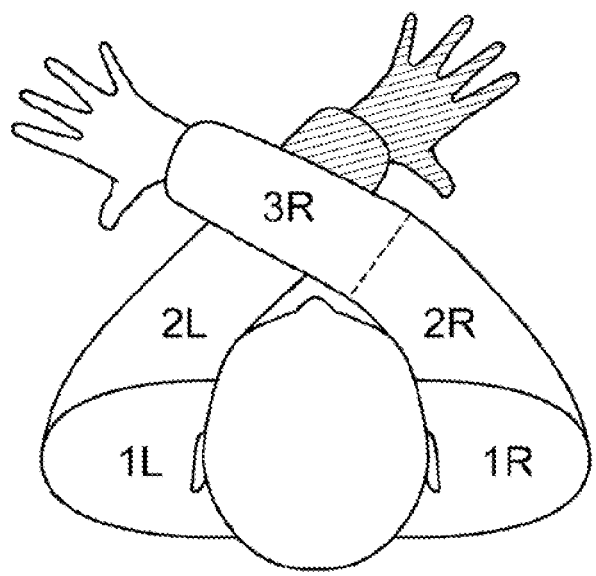
FIG. 5 is an explanatory view depicting an example of an operation for detecting a crossing state of arms of a user in the head-mounted apparatus according to the embodiment of the present invention.
Figure 5:
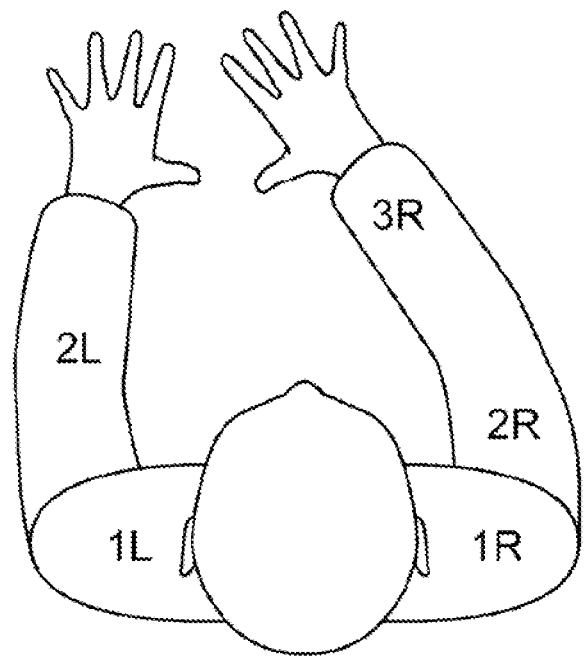

In addition, in the case where the areas which are obtained based on the data associated with the image captured by the left-side detection camera 13L and in which the feature amount is continuously changed, and the areas which are obtained based on the data associated with the image captured by the right-side detection camera 13R and in which the feature amount is continuously changed are not adjacent to each other, the head-mounted apparatus 10 decides that the arms of the user do not cross each other (FIG. 5(*b*)).

Detection of Shoulder

Moreover, the head-mounted apparatus 10 of this embodiment may be provided with light emitting means such as infrared light emitting devices or light emitting diode (LED) flashes on the left and right sides of the housing 11. In the case where the head-mounted apparatus 10 is provided with the light emitting means, in detecting the first site of the body of the user (such as the position of the shoulder of the user), the image capturing may be ca cried out by the detection camera 13 by lighting these light, emitting means.

When the light emitting means provided in the housing 11 are lighted, if the reference of the brightness (exposure) is set based on an average of luminance of the entire screen, or the like, then, like the shoulder of the user, the sits of the body of the user close to the light emitting means is imaged in an over-exposure state (in a state in which the highlights are blown out). Then, the head-mounted apparatus 10 may light the light emitting means to carry out the image capturing with the detection camera 13 in such a way that the site of the body of the user close to the light emitting means becomes the over-exposure state. In this case, the over-exposure area may be detected from the data associated with the image captured with the detection camera 13, thereby detecting the image portion corresponding to the first site of the body of the user.

Moreover, the head-mounted apparatus 10 of this embodiment, with respect to the first site of the body of the user, may not detect the portion closest to the light emitting means or detect the over-exposure portion every time, bat after ones the detection is carried out, may track the motion from the data associated with the image captured by the detection camera 13. With regard to the processing for tracking the motion, the widely known method can be adopted.

Consideration of Direction of Neck

In addition, although the description of this embodiment has been given until now with respect to the example in which for measuring the position and the direction of the head-mounted apparatus 10, the motion sensor is used, this embodiment is by no means limited to that example.

For example, as exemplified in FIG. 6, an angle of rotation of the neck with a median line of the user as the axis is set as an angle θ of a direction of the nose of the user (the line-of-sight direction when the user looks straight ahead) with respect to the coronal plane C (the plane containing the line segment connecting the left and right shoulders) of the user. In this case, the areas corresponding to the portions of the shoulders are detected from the data associated with the image captured by the detection camera 13, and the information associated with the areas concerned is used to obtain the angle θ.

Specifically, the head-mounted apparatus 10 detects the image portion of the shoulder as the first site of the body of the user from the data associated with the image captured by the detection camera 13. Then, the head-mounted apparatus 10 subjects the image portion concerned to the ellipse fitting. Then, the head-mounted apparatus 10, with the major axis direction of this ellipse as the direction of the straight line within the coronal plane, sets an angle between the transverse axis of the image data and the major axis direction as the angle θ of rotation of the neck with the median line as the axis (0≤θ≤90 degrees).

FIG. 6 depicts an example in which in the case where the neck of the user is directed to the normal line direction of the coronal plane (in the case where the neck of the user faces the front), the angle of rotation is decided to be 90 degrees (A), and when the neck of the user is inclined by angle θ with respect to the coronal plane, the angle of rotation is decided to be θ degrees from the image data obtained by the detection camera 13 (B).

Incidentally, there is the case where the shoulders of the user are not contained in the field of view of any one of the left and right detection cameras 13L and 13R depending on the direction of the neck in the some cases. However, since the coronal plane is symmetrical with respect to the crosswise direction of the user, if the angle θ of rotation of the neck described above is obtained from the image data obtained by any one of the left and right detection cameras 13L and 13R, then, the angle of rotation of the neck obtained from the other image data also becomes the same as the angle θ of rotation.

The head-mounted apparatus 10 obtains the information associated with the angle θ of rotation of the neck in such a way, thereby sending the information associated with the angle θ of rotation to the video supplying apparatus 20, which results in that the video supplying apparatus 20 can calculate the information associated with the position and direction of the head-mounted apparatus 10 (more specifically, the information associated with the position of the detection camera 13). Then, the video supplying apparatus 20 shall be able to calculate the information associated with the positions of the sites, of the body of the user, such as the positions of the hand and the arm of the user, which the head-mounted apparatus 10 detects based on the image data obtained by the detection camera 13.

According to this embodiment, since the position or the like of the hand of the user is specified based on the data associated with the image captured by the detection camera 13, the motion of the user can be detected without carrying out the manipulation for the controller.

REFERENCE SIGNS LIST

10 Head-mounted apparatus, 11 Housing, 12 Front camera, 13 Detection camera, 14 Control portion, 15 Communication processing portion, 20 Video supplying apparatus, 30 Relay apparatus, 31 Video display unit, 32 Video display processing portion, 41 Feature amount calculating portion, 42 First detection portion, 43 Area detecting portion, 44 Second detection portion, 45 Position data producing portion

The invention claimed is:

1. A head mounted apparatus, comprising:
   imaging means mounted to a housing to be worn on a head of a user;
   first detection means for receiving an image captured by the imaging means, detecting a first image portion corresponding to a shoulder of the user from the image, and acquiring a first predetermined feature amount in the first image portion thus detected;
   first area specifying means for specifying an area which contains the first image portion within the image, and in which the first predetermined feature amount is continuously changed;
   second detection means for receiving an image captured by the imaging means, detecting a second image portion corresponding to an upper arm of the user from the image, and acquiring a second predetermined feature amount in the second image portion thus detected;

second area specifying means for specifying an area which contains the second image portion within the image, and in which the second predetermined feature amount is continuously changed;

third detection means for receiving an image captured by the imagine means, detecting a third image portion corresponding to a lower arm of the user from the image, and acquiring a third predetermined feature amount in the third image portion thus detected;

third area specifying means for specifying an area which contains the third image portion within the image, and in which the third predetermined feature amount is continuously changed; and fourth detection means for detecting a fourth image portion corresponding to a hand of the user different from the lower arm from an image portion within the specified area specified by the third area specifying means.

2. The head mounted apparatus according to claim 1, wherein the feature amount is an amount relating to a distance between a subject imaged in an image portion, and the imaging means.

3. The head mounted apparatus according to claim 1, wherein the third determined feature amount is information representing a normal line direction of a subject imaged in an image portion.

4. A method for detecting objects using a head mounted apparatus including imaging means mounted to a housing to be worn on a head of a user, the method comprising:

by first detection means, receiving an image captured by the imaging means, detecting a first image portion corresponding to a shoulder of the user from the image, and acquiring a first predetermined feature amount in the first image portion thus detected;

by first area specifying means, specifying an area which contains the first image portion within the image, and in which the first predetermined feature amount is continuously changed;

by second detection means receiving an image captured by the imaging means, detecting a second image portion corresponding to an upper arm of the user front the image, and acquiring a second predetermined feature amount in the second image portion tints detected;

by second area specifying means, specifying an area which contains the second image portion within the image, and in which the second predetermined feature amount is continuously changed;

by third detection means, receiving art image captured by the imaging means, detecting a third image portion corresponding to a tower arm of the user front the image, and acquiring a third predetermined feature amount in the third image portion thus detected, by third area specifying means, specifying an area which contains the third image portion within the image, and in which the third predetermined feature amount is continuously changed; and by fourth detection means, detecting a fourth image portion corresponding to a hand of the user different from the lower arm from an image portion within the specified area specified by the third area specifying means.

5. A non-transitory computer-readable information storage medium storing a program for a computer connected to a head mounted apparatus including imaging means mounted to a housing to be worn on a head of a user, the program comprising:

by first detection means receiving an image captured by the imaging means, detecting a first image portico corresponding to a shoulder of the user from the image, and acquiring a first predetermined feature amount in the first image portion thus detected;

by first area specifying means, specifying an area which contains the first image portion within the image, and in which the first predetermined feature amounts continuously charged, by second detection means, receiving an image captured by the imaging means, detecting a second image portion corresponding to an upper arm of the user from the image, and acquiring a second predetermined feature amount in the second image portion thus detected;

by second area specifying means, specifying an area which contains the second image portion within the image, and in which the second predetermined feature amount is continuously changed, by third detection means, receiving an image captured by the imaging means, detecting a third image portion corresponding to a lower arm of the user from the image, and acquiring a third predetermined feature amount in the third image portion thus detected;

by third area specifying means, specifying an area which contains the third image portion within the image, and in which the third predetermined feature amount is continuously changed; and by fourth detection means, detecting a fourth image portion corresponding to a hand of the user different front the lower arm front an image portion within the specified area specified by the third area specifying means.

* * * * *